US009316349B1

(12) United States Patent
Parduhn et al.

(10) Patent No.: US 9,316,349 B1
(45) Date of Patent: Apr. 19, 2016

(54) LARGE CAPACITY ARTICULATING CLAMP ASSEMBLY

(71) Applicant: Pelco Products, Inc., Edmond, OK (US)

(72) Inventors: Stephen P. Parduhn, Edmond, OK (US); Kennith E. George, Edmond, OK (US); Derric K. Drake, Stillwater, OK (US)

(73) Assignee: PELCO PRODUCTS, INC., Edmond, OK (US)

( * ) Notice: Subject to any disclaimer, the term of this patent is extended or adjusted under 35 U.S.C. 154(b) by 22 days.

(21) Appl. No.: 14/215,008

(22) Filed: Mar. 16, 2014

Related U.S. Application Data

(60) Provisional application No. 61/800,072, filed on Mar. 15, 2013.

(51) Int. Cl.

*F16M 13/02* (2006.01)
*G08G 1/095* (2006.01)
*E01F 9/016* (2006.01)

(52) U.S. Cl.

CPC ................ *F16M 13/02* (2013.01); *E01F 9/016* (2013.01); *G08G 1/095* (2013.01)

(58) Field of Classification Search

CPC ........ E01F 9/0118; E01F 9/016; F16M 13/02
See application file for complete search history.

(56) References Cited

U.S. PATENT DOCUMENTS

| | | | | |
|---|---|---|---|---|
| 3,586,280 A | | 6/1971 | Parduhn | |
| 3,764,099 A | | 10/1973 | Parduhn | |
| 3,778,610 A | * | 12/1973 | Wolf | 362/418 |
| 3,854,685 A | | 12/1974 | Parduhn | |
| 4,032,248 A | | 6/1977 | Parduhn et al. | |
| D246,585 S | | 12/1977 | Parduhn | |
| D249,517 S | | 9/1978 | Parduhn | |
| 4,135,192 A | | 1/1979 | Parduhn | |
| 4,363,561 A | | 12/1982 | Hsieh | |
| D276,213 S | | 11/1984 | Parduhn | |
| D286,667 S | | 11/1986 | Parduhn | |
| 4,659,046 A | | 4/1987 | Parduhn | |

(Continued)

OTHER PUBLICATIONS

Philips Roadway Lighting, “Going Beyond the Road—Philips Office Road Application Guide,” 2012, 8 pages, Philips Roadway Lighting, Rosemont, IL, USA. The exact date of publication is unknown. This document was published prior to the effective filing date of the instant application, namely, Mar. 15, 2013, and prior to any foreign priority date of the present application.

*Primary Examiner* — Gary Hoge
(74) *Attorney, Agent, or Firm* — Mary M. Lee

(57) ABSTRACT

An articulating clamp assembly for traffic control assemblies. The clamp assembly includes first and second clamp members. The first clamp member, or tube saddle, has a rear face designed for attachment to a bracket tube. The rear face of the second clamp member is attachable either to the end of a mast arm by a tenon sleeve or to the side of the mast arm by cables or bands. The front ends of the first and second clamp members have inter-engaging serrated faces that allow adjustable engagement of the two clamp members. Each clamp member defines a continuous end-to-end conductor path, and the articulating ends are formed to create a continuous and substantially straight conductor path through the joint in the assembled clamp. In this way, the path of a conductor from the mast arm to the bracket tube is substantially straight facilitating the installation of large diameter conductors.

12 Claims, 18 Drawing Sheets

(56) References Cited

U.S. PATENT DOCUMENTS

| | | | | |
|---|---|---|---|---|
| 4,691,884 | A | 9/1987 | Parduhn | |
| 4,700,017 | A * | 10/1987 | Morand | 174/86 |
| D328,243 | S | 7/1992 | Parduhn | |
| D329,589 | S | 9/1992 | Parduhn | |
| D335,279 | S | 5/1993 | Parduhn | |
| 5,299,111 | A | 3/1994 | Parduhn et al. | |
| D373,947 | S | 9/1996 | Parduhn | |
| D379,756 | S | 6/1997 | Parduhn | |
| 5,645,255 | A | 7/1997 | Parduhn | |
| 5,935,478 | A | 8/1999 | Parduhn | |
| 6,204,446 | B1 | 3/2001 | Parduhn | |
| 6,328,270 | B1 * | 12/2001 | Elberbaum | 248/288.31 |
| 6,357,709 | B1 | 3/2002 | Parduhn | |
| 7,258,314 | B1 | 8/2007 | Parduhn et al. | |
| 7,390,110 | B2 | 6/2008 | Katz et al. | |
| 7,523,912 | B1 | 4/2009 | Woods | |
| 7,601,928 | B1 | 10/2009 | Magness et al. | |
| 7,997,546 | B1 | 8/2011 | Anderson et al. | |
| 8,173,904 | B1 | 5/2012 | Parduhn et al. | |
| 8,474,780 | B2 | 7/2013 | Parduhn et al. | |
| 2014/0105670 | A1 | 4/2014 | Plomteux | |

* cited by examiner

LARGE CAPACITY ARTICULATING CLAMP ASSEMBLY

CROSS-REFERENCE TO RELATED APPLICATIONS

This application claims the benefit of U.S. provisional application No. 61/800,072 entitled "Large Capacity Articulating Bracket," filed Mar. 15, 2013, the contents of which are incorporated herein by reference.

FIELD OF THE INVENTION

The present invention relates generally to traffic control devices and more particularly to brackets for use with such devices.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

DETAILED DESCRIPTION OF THE PREFERRED EMBODIMENT(S)

Traffic signals and other traffic control devices often are supported from mast arms; the signal is supported in a bracket assembly, often comprising a main support tube, and the bracket is then attached to the mast arm by a clamp assembly. This mounting arrangement has worked well for many years. Prior art devices for supporting traffic devices include those shown and described in U.S. Pat. No. 5,645,255, entitled Articulating Clamp Assembly for Traffic Control device, issued Jul. 8, 1997, U.S. Pat. No. 6,357,709, entitled Bracket Assembly with Split Clamp Member, issued Mar. 19, 2002, and U.S. Pat. No. 4,659,046, entitled Traffic Control Device Mast Arm Bracket, issued Apr. 21, 1987. The contents of these prior patents are incorporated herein by reference.

As traffic control devices become more varied and complex, they require more and larger conductors. Larger conductors tend to be stiffer. Consequently, it is becoming increasing difficult to route the necessary conductors through conventional mounting hardware. The present invention is directed to an improved articulating clamp assembly for mounting traffic control devices. The inventive clamp assembly permits easy routing of larger and/or multiple conductors while maintaining strength and versatility.

Figure 1:
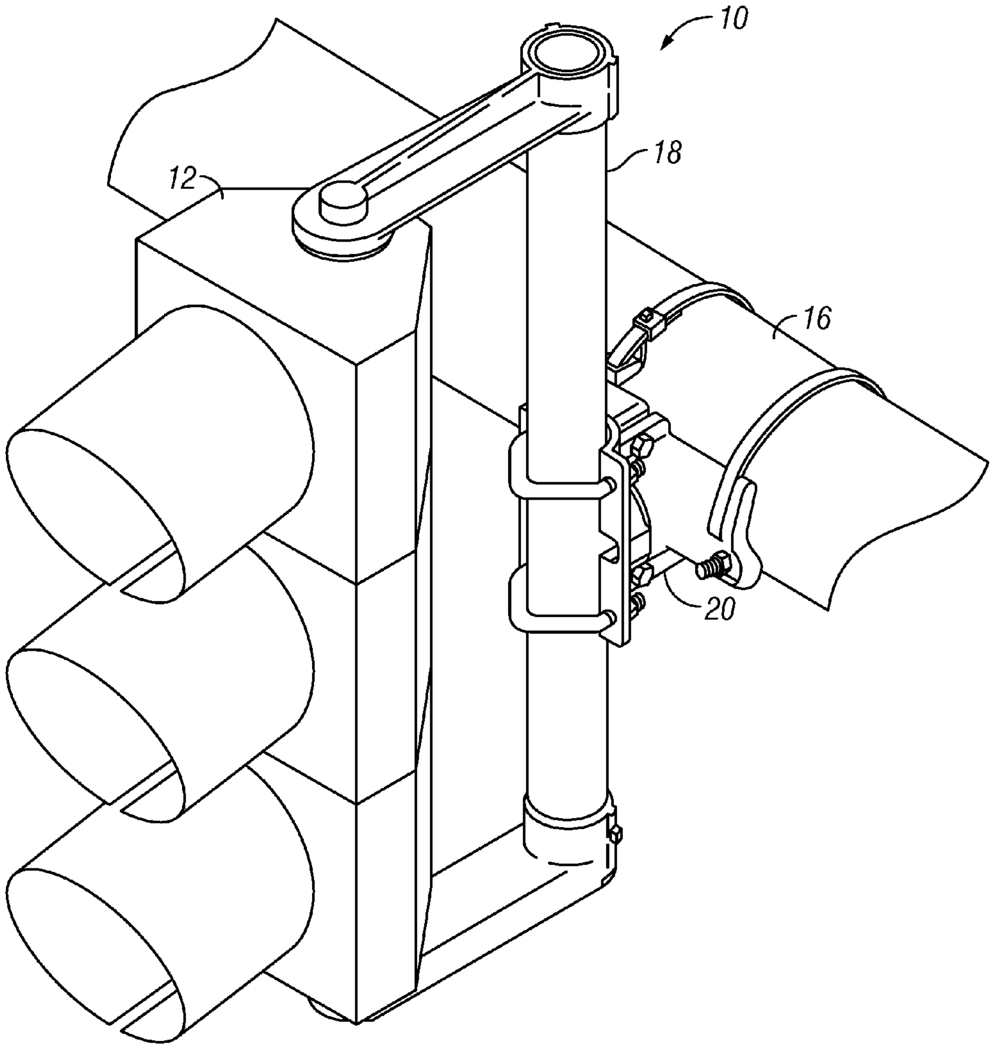
FIG. 1 is a perspective view of a traffic control assembly constructed in accordance with the present invention and including a traffic signal, a bracket supporting the traffic signal, and a clamp assembly attaching the bracket to a mast arm.

Turning now to the drawings in general and to FIG. 1 in particular, there is shown therein a traffic control assembly constructed in accordance with the present invention and designated generally by the reference number 10. The traffic control assembly 10 generally comprises a traffic control device, such as the traffic signal 12. The traffic light 12 is a typical vertical three-light signal. However, as used herein, "traffic control device" refers to any signal, sign, monitor, camera, or other device supported by or over or near a roadway for controlling or monitoring vehicular or pedestrian traffic.

The traffic control assembly 10 further comprises a mounting assembly 14 for supporting the signal 12 on a mast arm 16 or other elongate support structure. The mounting assembly 14 preferably comprises a bracket assembly 18, on which the signal 12 is mounted, and a clamp assembly 20 that attaches the bracket assembly to the mast arm 16.

Figure 2:
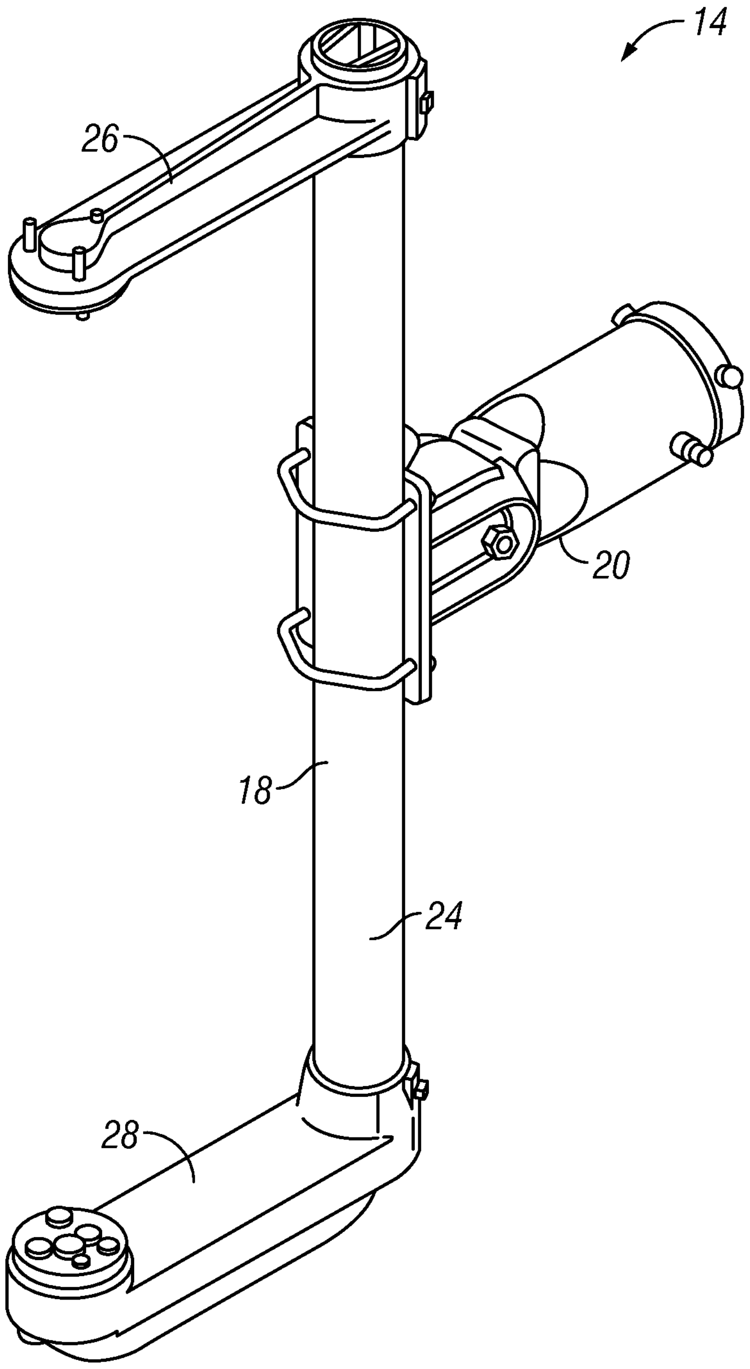
FIG. 2 is a right side perspective view of the mounting assembly of FIG. 1 including the bracket assembly and the clamping assembly.
Figure 3:
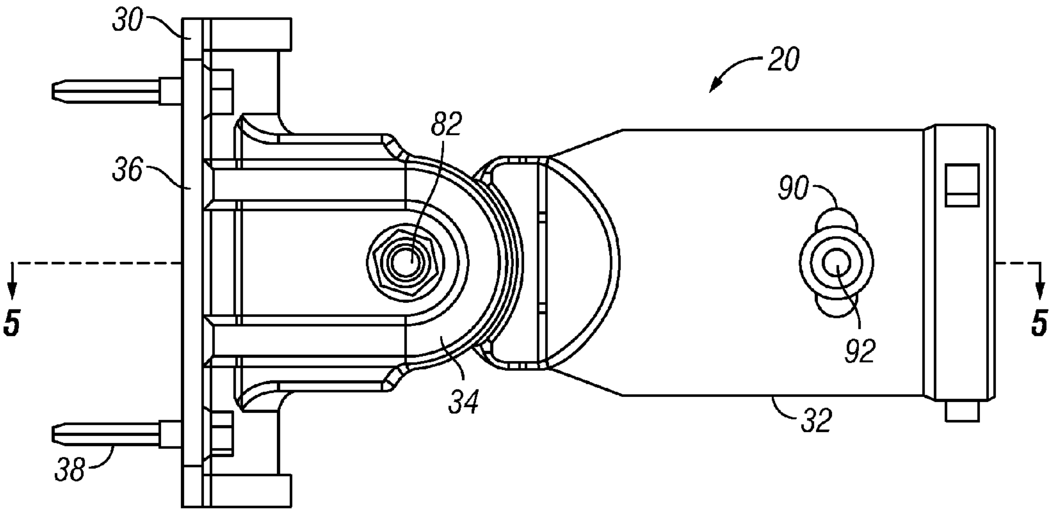
FIG. 3 is a right side elevational view of the clamping assembly shown in FIG. 2.

FIG. 2 illustrates a preferred mounting assembly 14 apart from the signal 12 and mast arm shown only in FIG. 1. The bracket assembly 18 comprises an elongate tubular support 24, an upper arm 26 and a lower arm 28. The clamp assembly 20 shown in FIG. 2 is a tenon mount style, which will be described with reference to FIGS. 3-20.

The assembled clamp assembly 20 is shown in FIGS. 3-7. The clamp assembly 20 comprises a first clamp member 30 and a second clamp member 32. The first clamp member 30 is a saddle style clamp for attaching to the tube 24 of the bracket assembly 18, and the second clamp member 32 includes a tenon sleeve for attachment to the end of a mast arm (not shown) or other tubular extension.

The first clamp member 30, shown separately in FIGS. 8-12, comprises a first end 34 and a second end 36. The second end 36 comprises curved or saddle style plate configured to receive the tube 24 of the bracket assembly 18. U-bolts, designated generally at 38 are included to secure the plate 36 to the tube 24. As best seen in FIGS. 8-12, the first end 34 defines an opening 42, and the second end 36 defines an opening 44. These openings 42 and 44 are connected by an internal channel that forms a substantially straight first conductor path segment 46 extending through the first clamp member 30, the first conductor path segment indicated by the arrow in FIGS. 11 and 12. The first clamp member 30 has a longitudinal axis "$X_1$" shown by the dashed line in FIGS. 11 and 12.

With continuing reference to FIGS. 8-12, the first end 34 of the first clamp member 30 comprises a first joint face 50. The joint face 50 defines a surface for engaging with mating surface on the second clamp member 32 yet to be described. In the preferred embodiment, the first joint face 50 comprises a serrated ring 52 for a purpose that will become apparent. The first end 34 of the first clamp member 30 may also include upper and lower walls 54 and 56 that border the upper and lower edges of the joint face 50 and that partially define the opening 42. The upper and lower walls 54 and 56 may further define a side opening or window 60 spaced a distance from and parallel to the joint face 50.

Referring still to FIGS. 3-7 and turning now also to FIGS. 13-17, the second clamp 32 will be described. The second clamp 32 has a first end 64 and a second end 66. An opening 68 in the first end 64 and an opening 70 in the second end 66 connect an internal channel forming a substantially straight second conductor path segment 72 extending through the second clamp member, as seen best in FIG. 15. The second clamp member 32 has a longitudinal axis "$X_2$" shown by the dashed line in FIGS. 15 and 16.

With continuing reference to FIGS. 13-17, the first end 64 of the second clamp member 32 comprises a second joint face 76. The joint face 76 defines a surface for engaging with the surface 50 on the first clamp member 30. In the preferred embodiment, the second joint face 76 comprises a second serrated ring 78 configured to engage the first serrated ring 52 on the first joint face 50 of the first clamp member 30.

Now it will be apparent that the serrated rings 52 and 78 when engaged with each other form an articulating joint, designated generally at 80 (FIG. 5) that permits the angle of one clamp member to be adjusted relative to the other clamp member. Most preferably, this joint 80, permits one clamp member to be rotated relative to the other clamp member. Thus, once the desired angle is achieved by positioning the joint 80, a bolt 82 is used to secure the joint faces 50 and 76 in the selected position, as best seen in FIG. 5.

Figure 5:
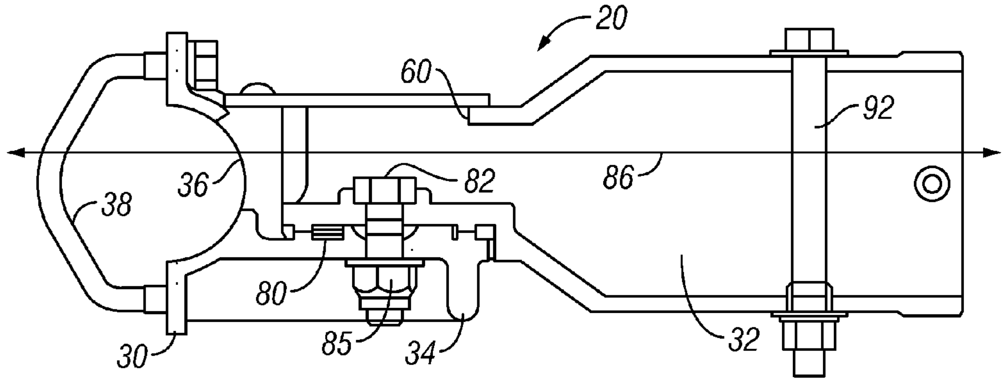
FIG. 5 is a sectional view taken along line 5-5 in FIG. 3.
Figure 6:
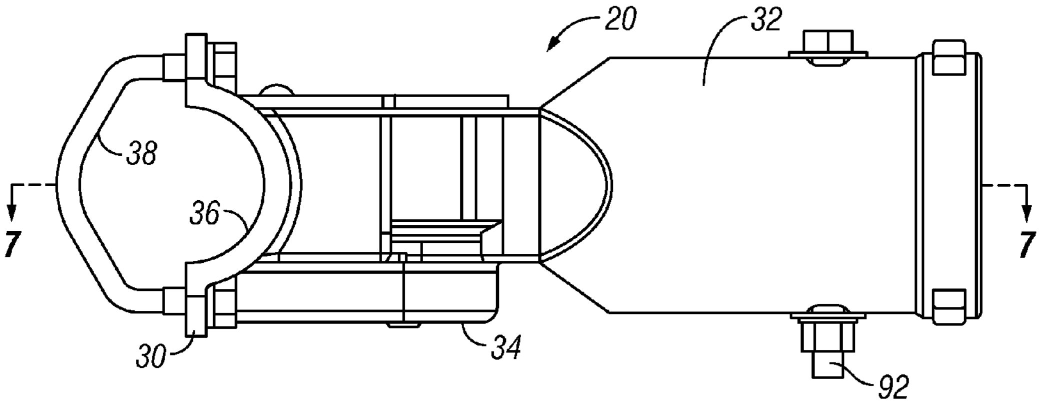
FIG. 6 is a plan view of the clamping assembly of FIG. 3.
Figure 7:
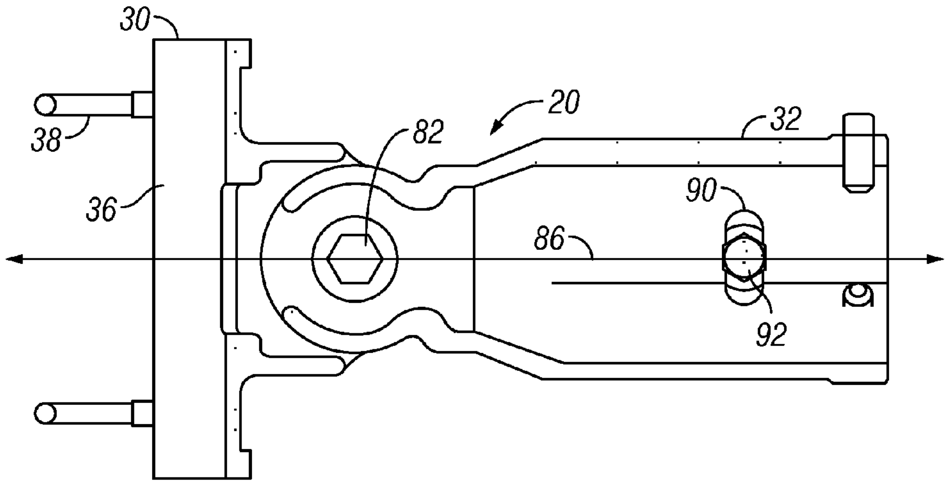
FIG. 7 is a sectional view taken along line 7-7 in FIG. 6.
Figure 8:
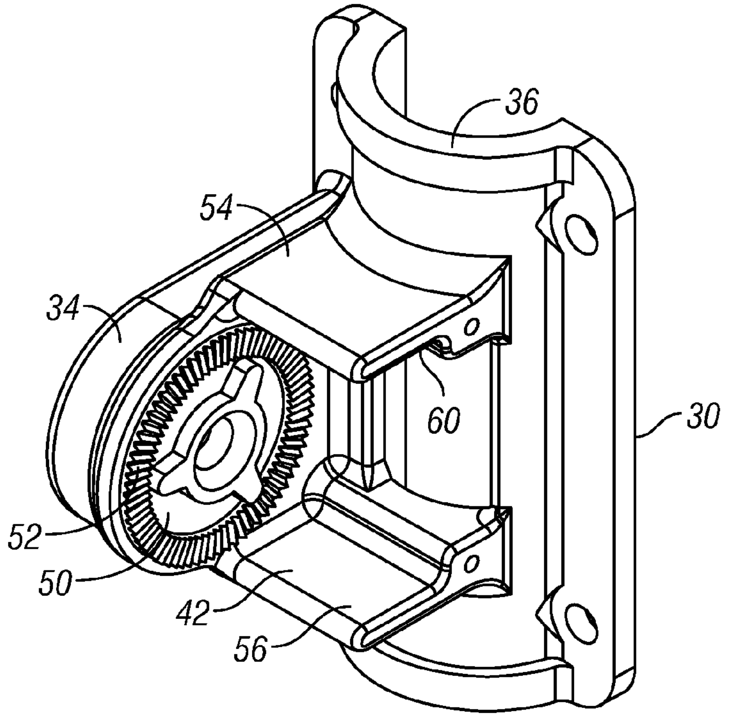
FIG. 8 is a left side perspective view of the tube saddle or first clamp member of the clamping assembly of FIG. 3.
Figure 9:
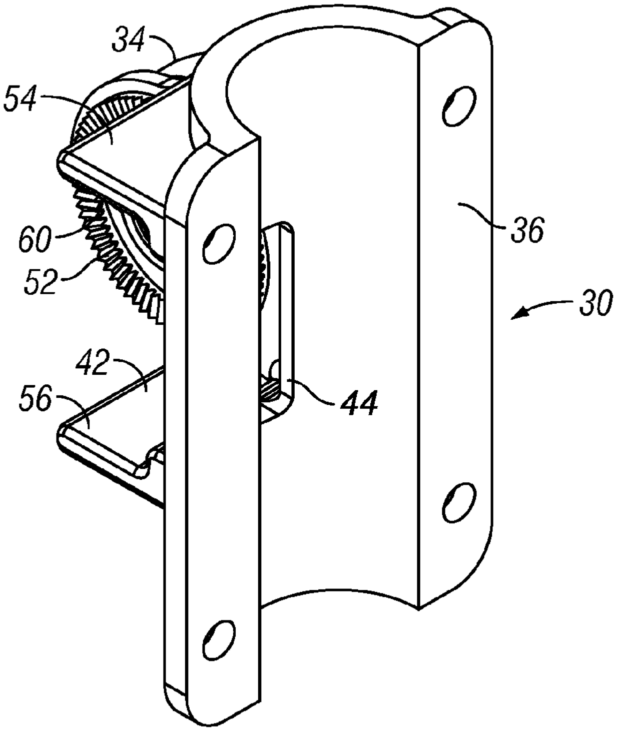
FIG. 9 is a right side perspective view of the tube saddle or first clamp member of the clamping assembly of FIG. 3.
Figure 10:
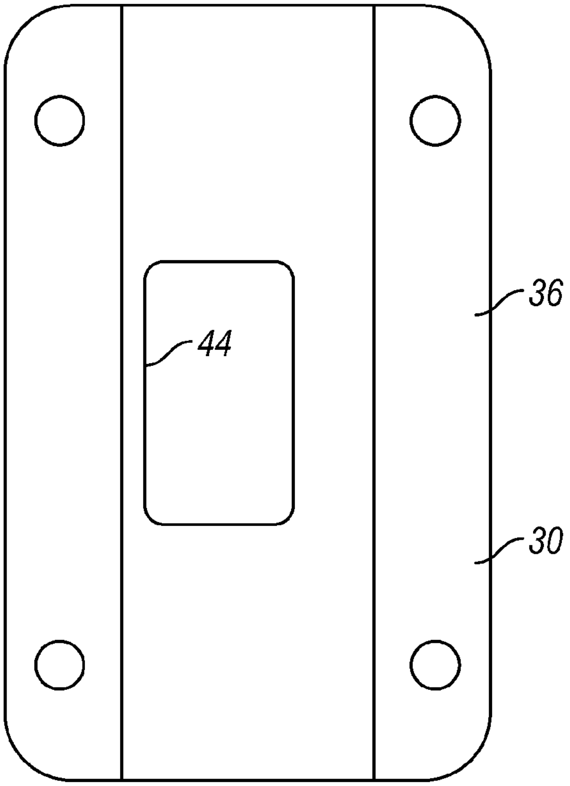
FIG. 10 is a rear view of the first clamp member of the clamping assembly of FIG. 3.
Figure 11:
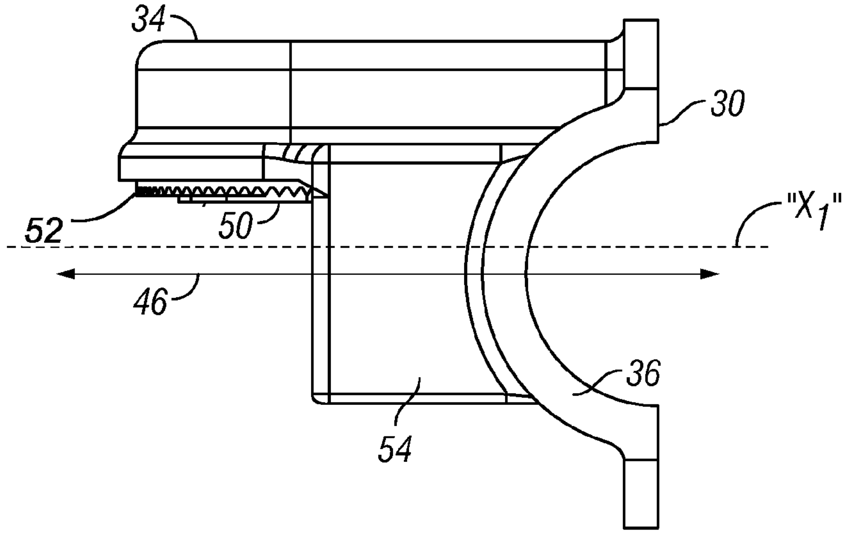
FIG. 11 is a plan view of the first clamp member of the clamping assembly of FIG. 3.
Figure 12:
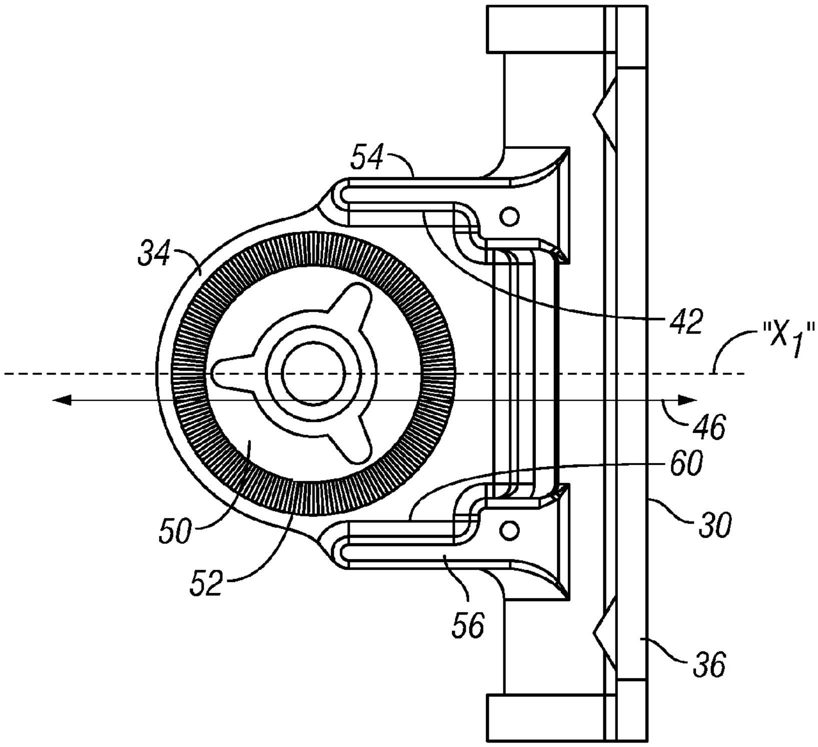
FIG. 12 is a side elevational view of the first clamp member of the clamping assembly of FIG. 3.
Figure 13:
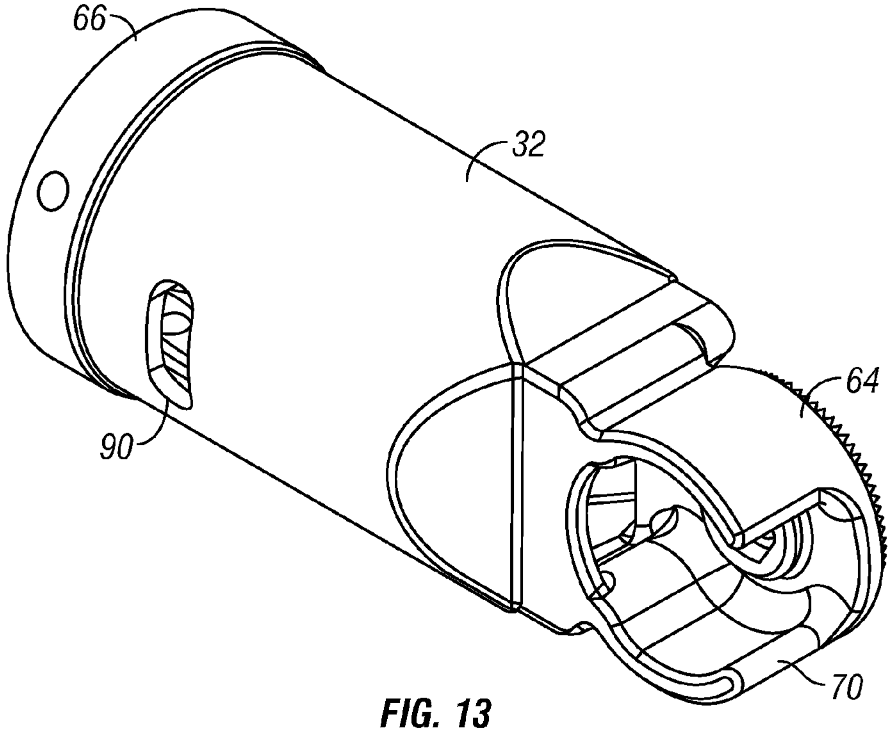
FIG. 13 is a perspective view of the tenon sleeve or second clamp member of the clamping assembly of FIG. 3.
Figure 14:
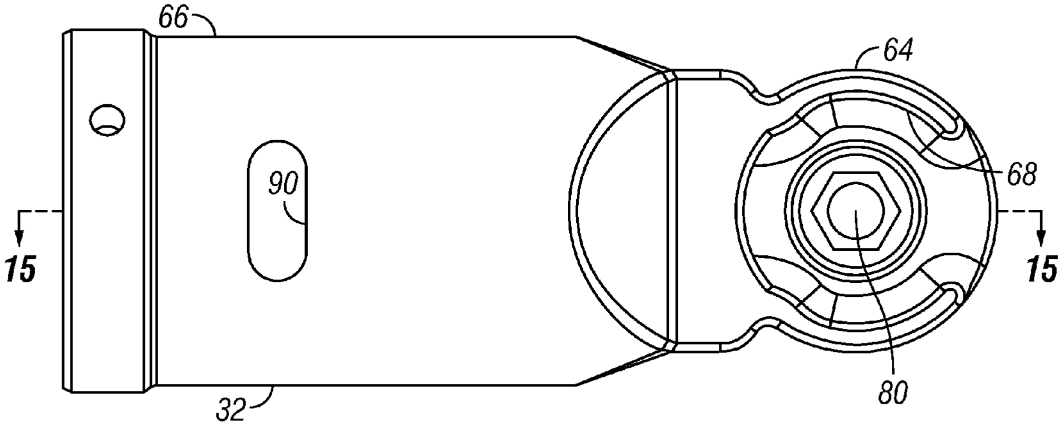
FIG. 14 is left side elevational view of the tenon sleeve.
Figure 15:
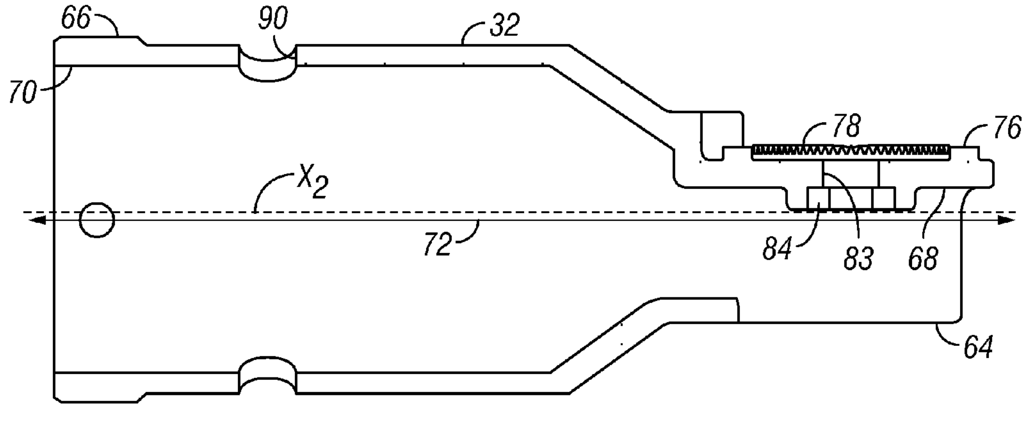
FIG. 15 is a sectional view taken along line 15-15 of FIG. 14.
Figure 16:
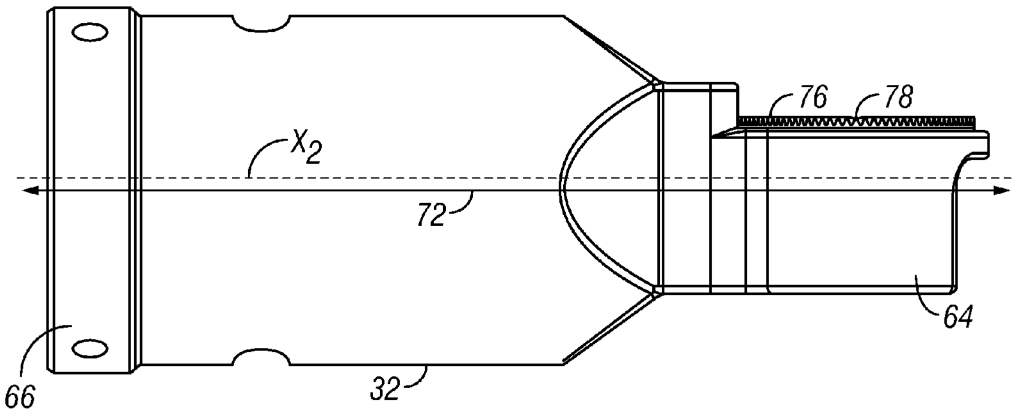
FIG. 16 is a plan view of the tenon sleeve.
Figure 17:
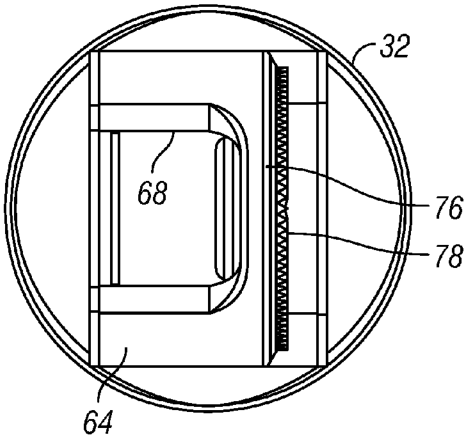
FIG. 17 is an end view of the tenon sleeve.
Figure 18:
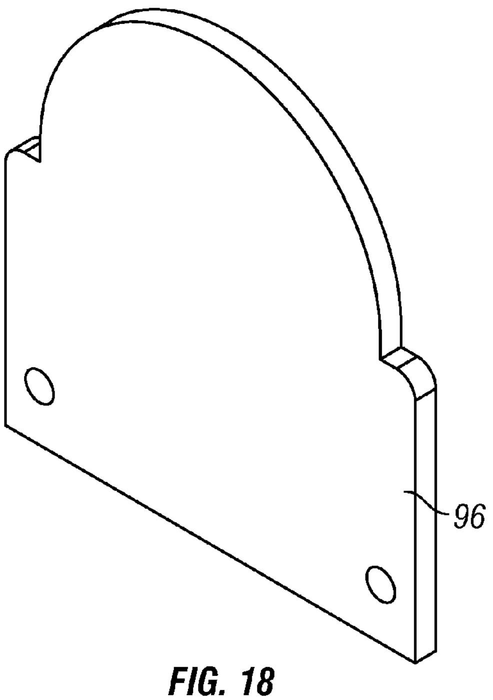
FIG. 18 is a perspective view of the protective cover of the clamping assembly of FIG. 3.
Figure 19:
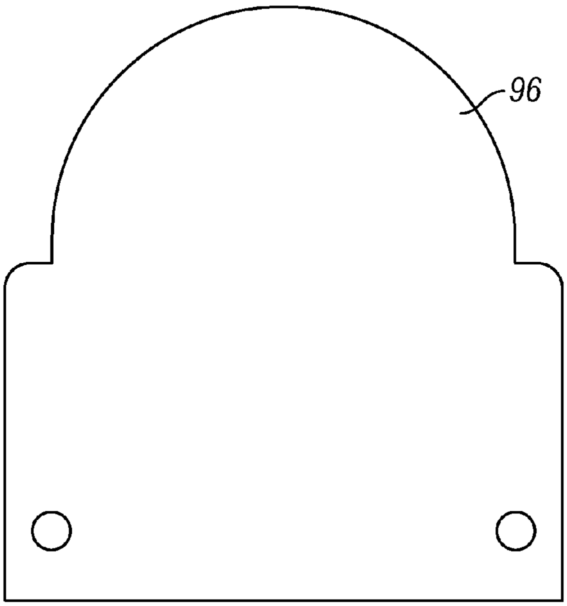
FIG. 19 is a front view of the protective cover.
Figure 20:
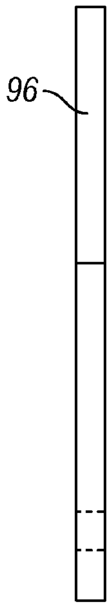
FIG. 20 is a side view of the protective cover.

It will also be noted, as shown in FIGS. 5 and 7, that the joint 80 connects the first end 34 of the first clamp member 30 to the first end 64 of the second clamp member in a manner that connects the first conductor path segment 46 (FIGS. 11 & 12) with the second conductor path segment 72 (FIGS. 15 & 16) to form a complete conductor path 86 extending end-to-end through the clamp assembly 20. It will also be appreciated that this conductor path 86 is substantially straight along its entire length when viewed vertically (FIG. 5) and horizontally (FIG. 7) when the longitudinal axes $X_1$ and $X_2$ of the first and second clamp members 30 and 32 are parallel, and shown herein.

Now it will also be appreciated the first and second clamp members 30 and 32 are formed so that the joint 80 formed by the abutting joint faces 50 and 75 is offset, that is, positioned to one side of the conductor path 86. Still further, it will be noted that the bolt 82 is only long enough to secure the abutting joint faces 50 and 75 and that the bolt does not extend transversely across the conductor path 86. This allows the conductor to be fed directly through the assembled clamp assembly 20 without navigating around a through bolt at the joint.

Returning to FIG. 13-17, the second end 66 of the second clamp 32 forms a tenon sleeve that is fittable on the end of a mast arm (not shown). In a known manner, the sleeve includes a slot 90 and a bolt 92 (FIGS. 3-7) for securing the tenon sleeve in position on the mast arm. During installation the conductor will easily pass around the bolt 92 because the relatively large diameter of the tenon sleeve and mast arm.

Figure 4:
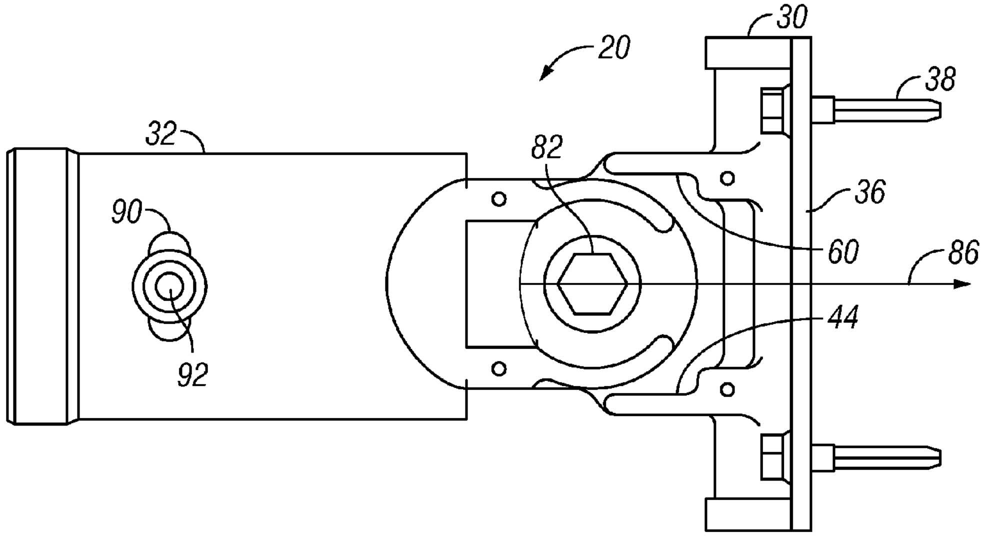
FIG. 4 is a left side elevational view of the clamping assembly shown in FIG. 3.

As shown in FIGS. 4 & 5, when the first and second clamp member 30 and 32 are bolted together at the joint 80, the window 60 provides side access to the conductor path 86 and the bolt 82. A protective cover 96, shown in detail in FIGS. 18-20, may be included to cover this opening.

Figure 22:
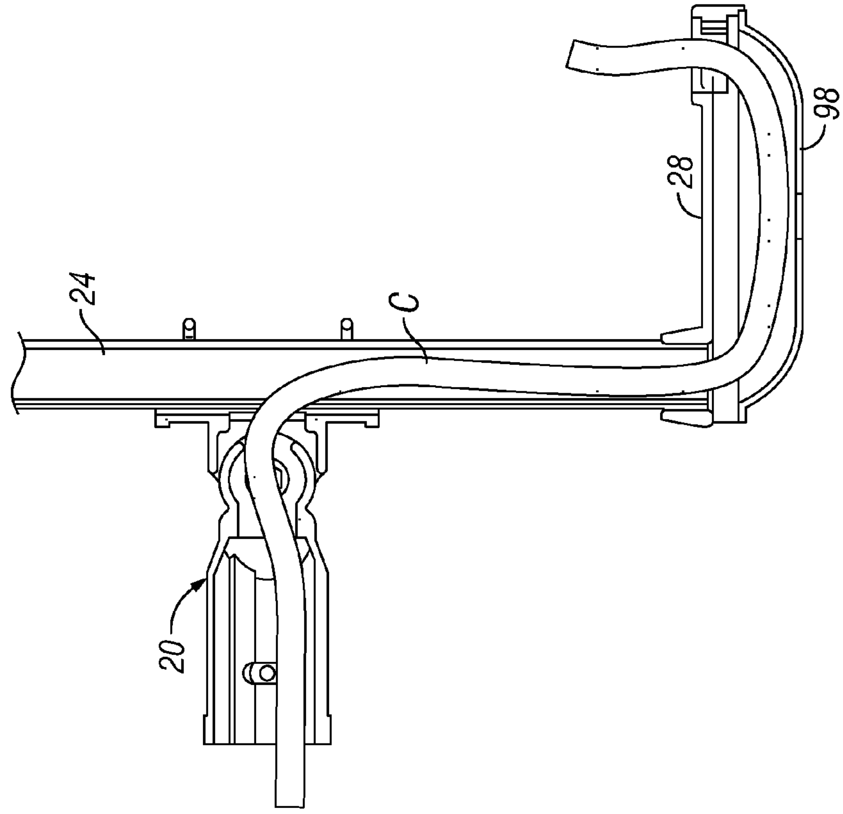
FIG. 22 is a sectional view of the tenon mount embodiment of the inventive mounting assembly showing the path of the larger conductor passing therethrough.
Figure 21:
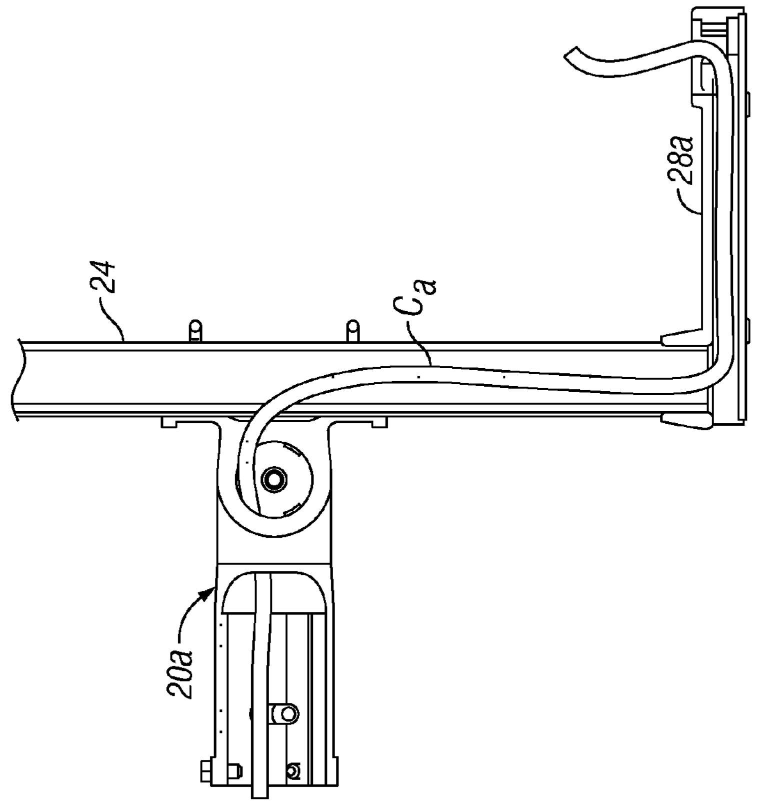
FIG. 21 is a vertical sectional view of prior art mounting assembly showing the path of a conductor passing therethrough.
Figure 21A:
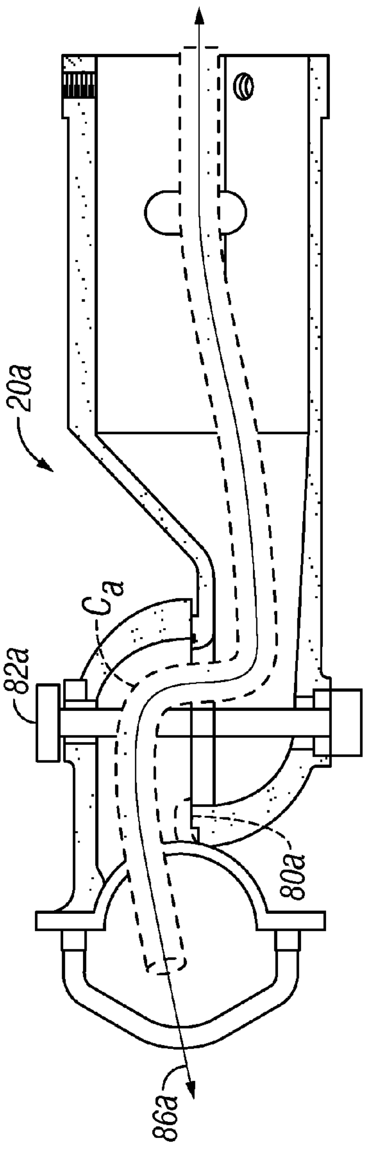
FIG. 21A is horizontal sectional view of the prior art clamp assembly showing the horizontal S-shaped path of the conductor as it passes through the adjoined ends members of the clamp assembly.
Figure 22A:
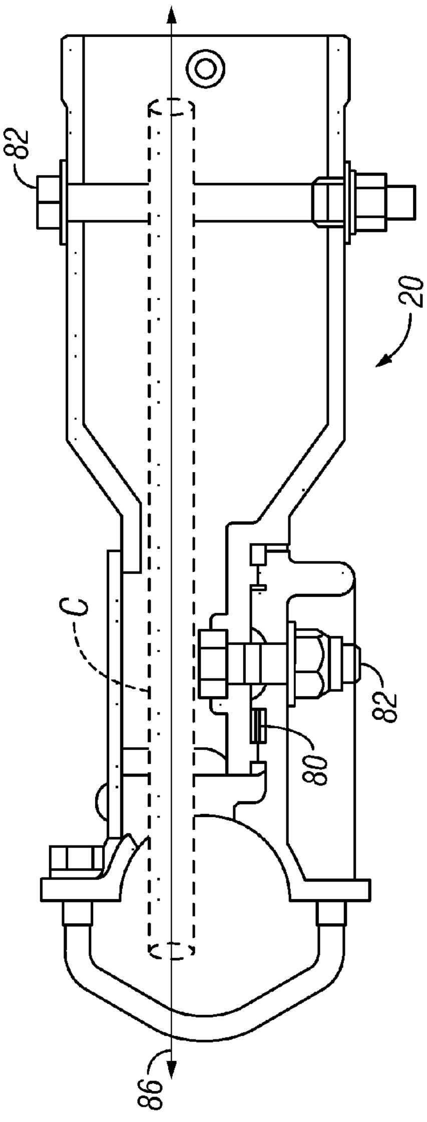
FIG. 22A is horizontal sectional view showing the generally straight path the conductor follows through the adjoined ends members of the inventive clamp assembly.
Figure 23:
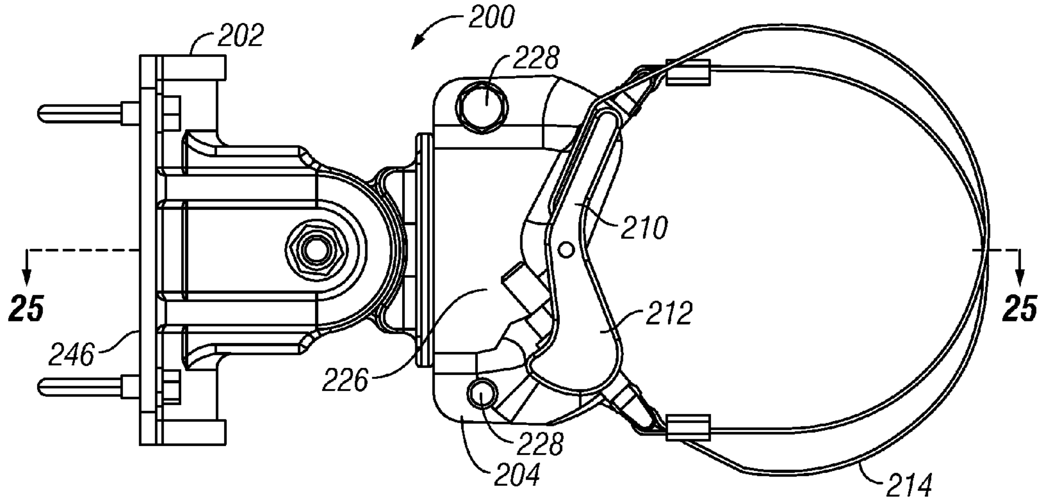
FIG. 23 is a right side elevational view of a second embodiment of the inventive clamping assembly comprising a band mount as the second clamp instead of a tenon sleeve.
Figure 24:
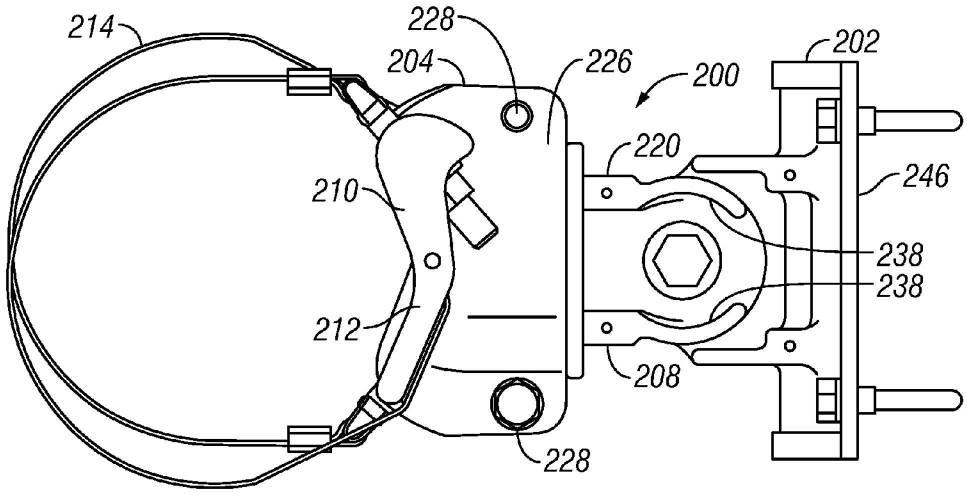
FIG. 24 is a left side elevational view of the band mount clamping assembly of FIG. 23.
Figure 25:
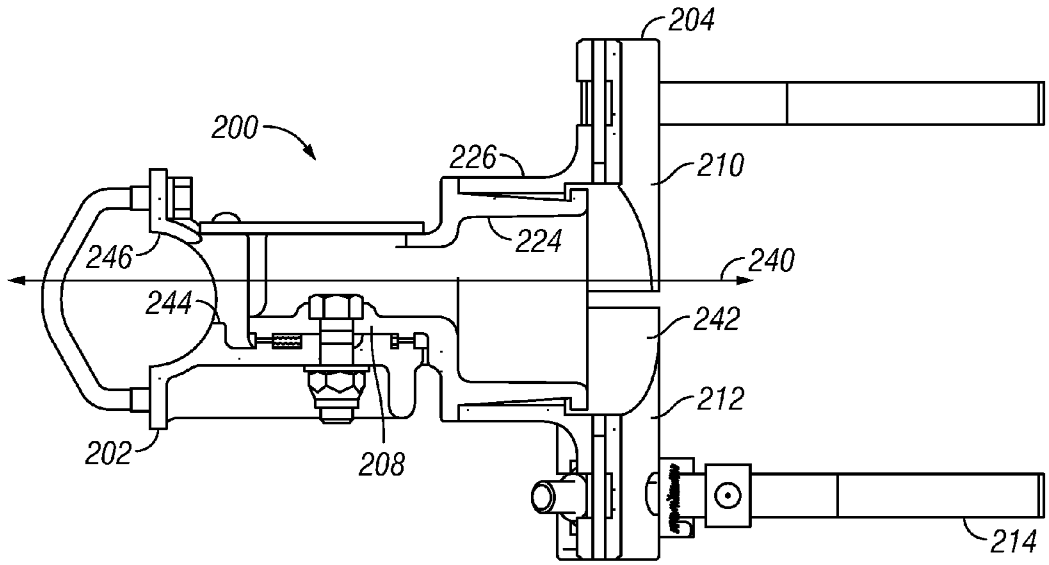
FIG. 25 is a sectional view taken along line 25-25 of FIG. 23.
Figure 26:
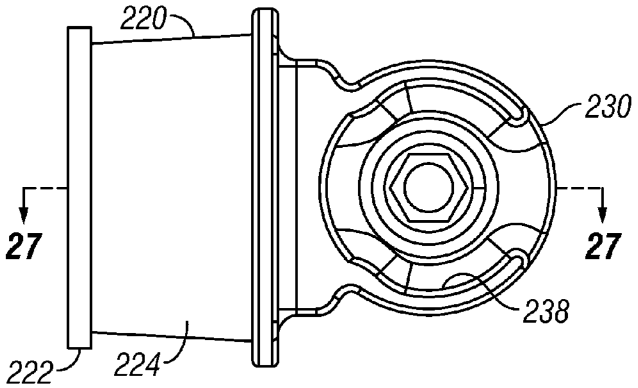
FIG. 26 is a left side elevational view of the articulating end member of the band mount style clamping assembly of FIG. 23.
Figure 27:
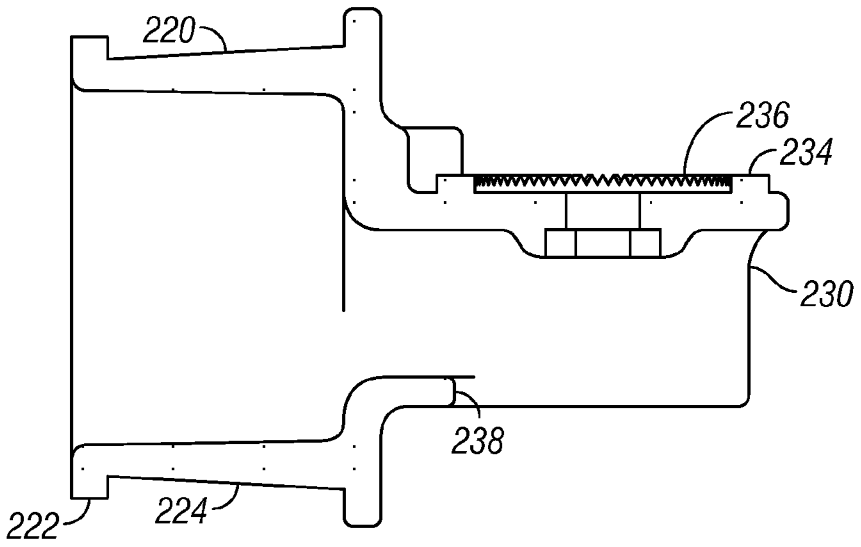
FIG. 27 is a sectional view of the end member taken along line 27-27 of FIG. 26.
Figure 28:
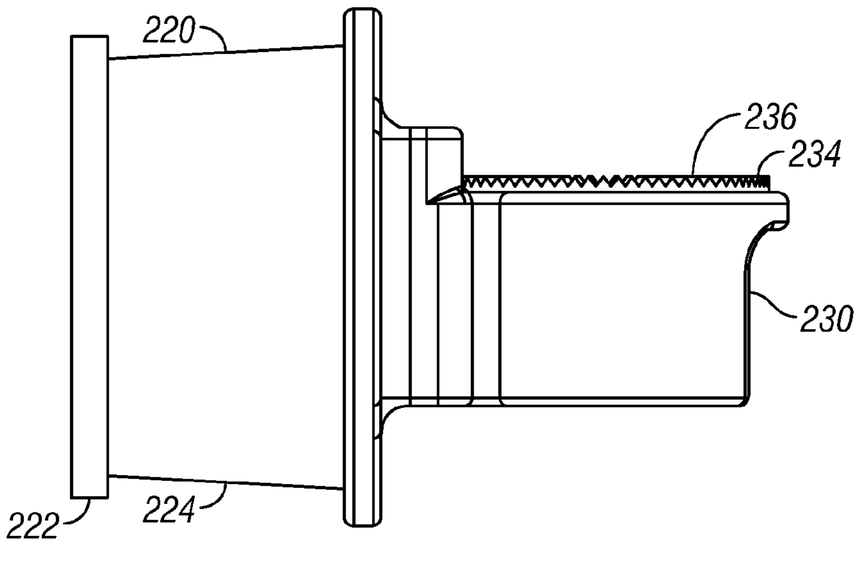
FIG. 28 is a plan view of the end member of the band mount style clamping assembly of FIG. 23.
Figure 29:
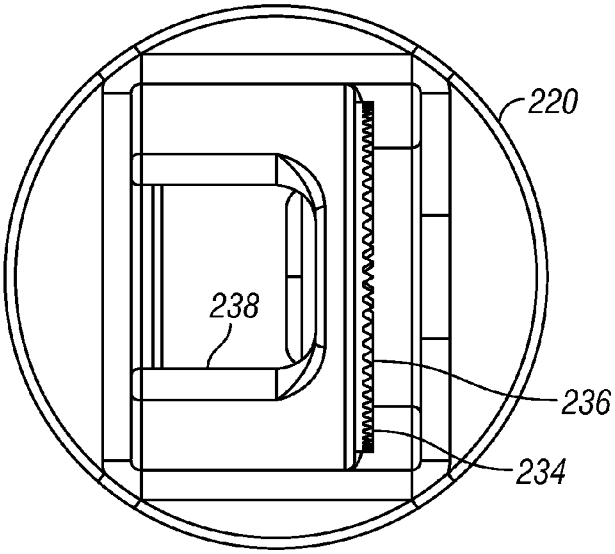
FIG. 29 is an end view of the end member of the band mount style clamping assembly of FIG. 23.
Figure 30:
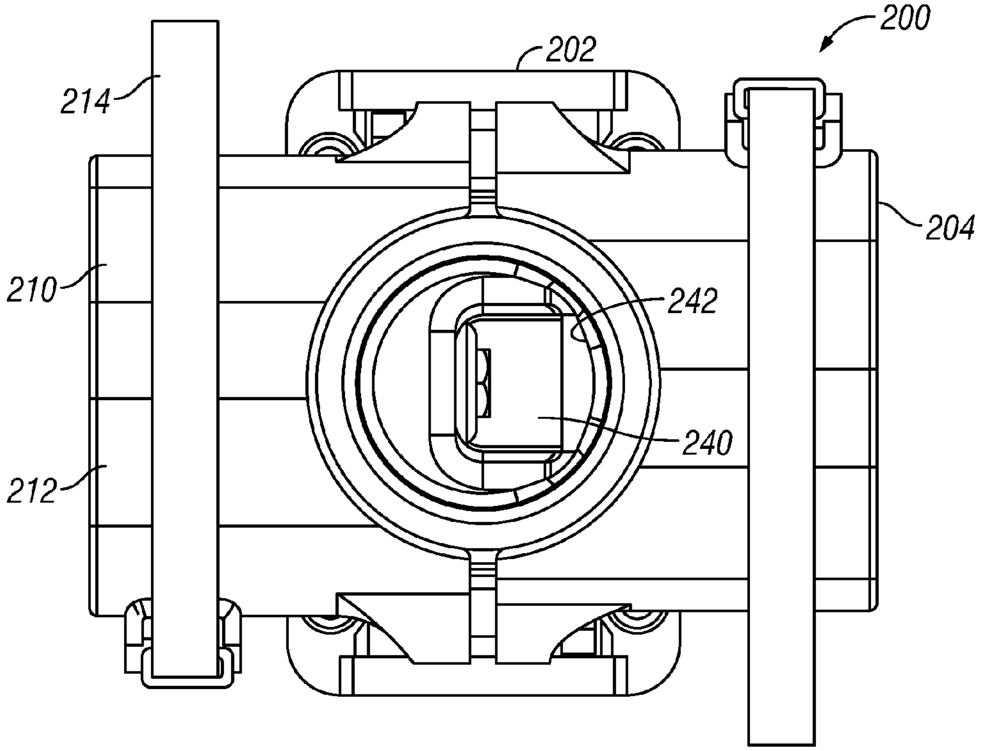
FIG. 30 is a mast arm end view of the assembled clamping assembly of FIG. 23.
Figure 31:
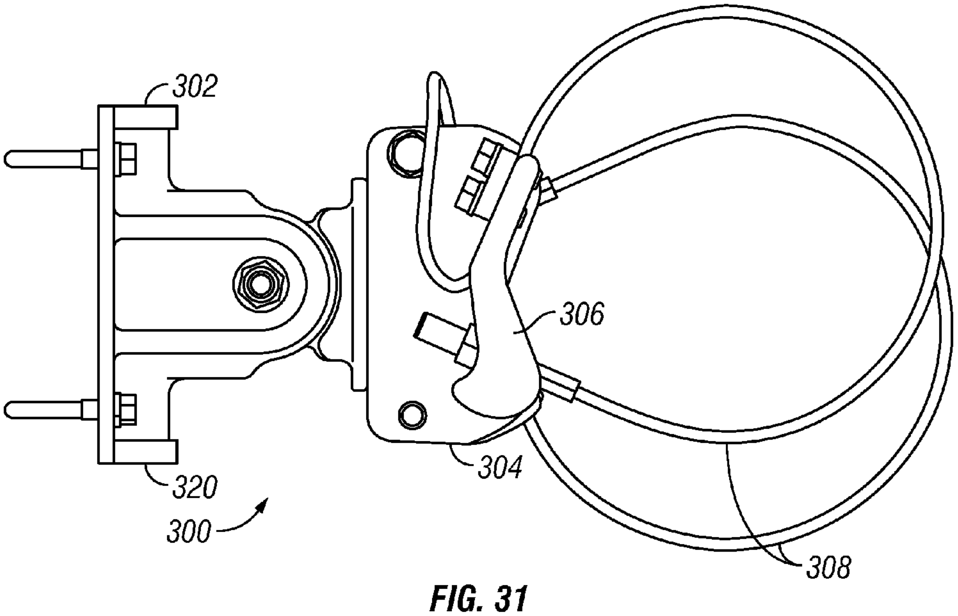
FIG. 31 is a right side elevational view of a third embodiment of the inventive clamping assembly comprising a cable mount as the second clamp instead of a tenon sleeve.
Figure 32:
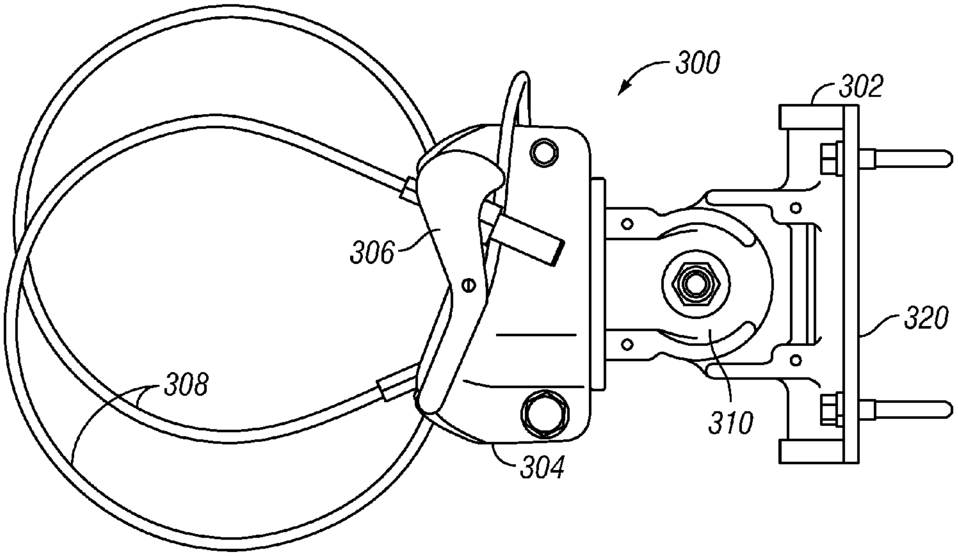
FIG. 32 is a left side elevational view of the cable mount clamping assembly of FIG. 31.
Figure 33:
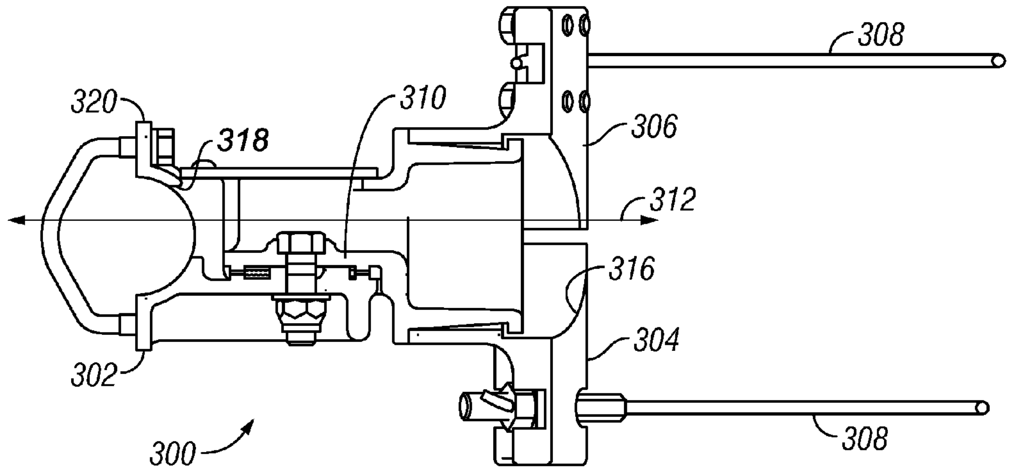
FIG. 33 is a sectional view taken along line 33-33 of FIG. 31.
Figure 34:
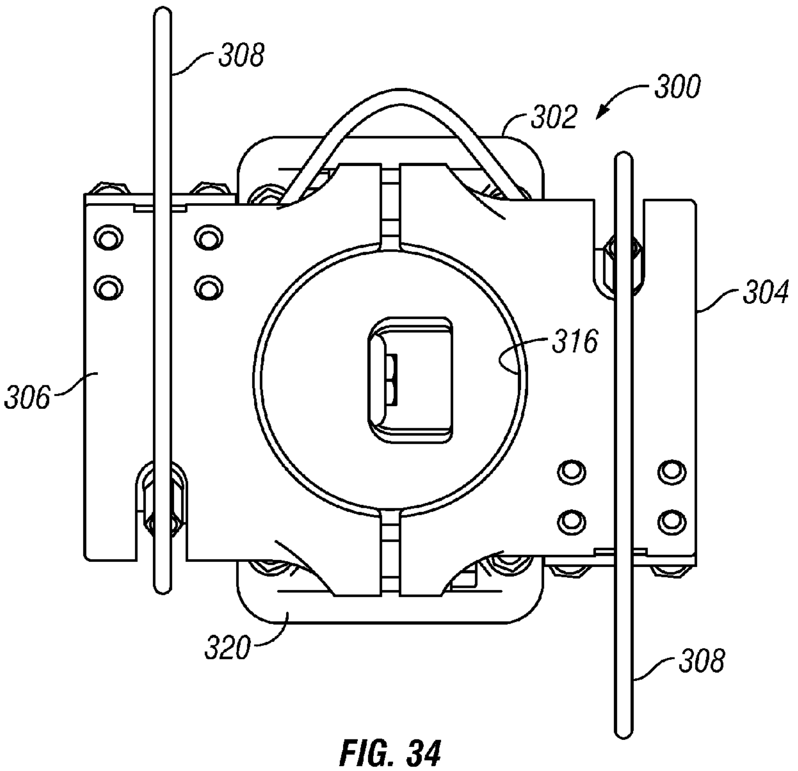
FIG. 34 is a mast arm end view of the assembled clamping assembly of FIG. 31.

The advantages of the inventive clamp assembly 20 as compared to the prior art clamp assembly 20*a* are illustrated in FIGS. 21, 21A, 22, and 22A. As previously described and as is shown in FIGS. 22 and 22A, in the inventive clamp assembly, a larger conductor, such as a five-eighths inch conductor "C" follows a relatively straight path through the clamp assembly 20 to the tube 24. The smaller conductor $C_a$ must follow an S-shaped conductor path 86*a* (FIG. 21A) as it passes through the conductor path $\mathbf{86}_a$ of the prior art clamp assembly 20*a*.

Referring still to FIG. 22, another feature of the bracket assembly 18 of the present invention will be explained. An enlarged and deeper protective cover 98 is provided on the lower arm 28 of the bracket assembly 18. As illustrated in FIG. 22, this deeper profile allows the larger conductor C to make wider turns as it negotiates the path through the bracket 18.

The above described embodiment of FIGS. 2-22A illustrates a clamp assembly with a tenon style mount for the mast arm. However, the present invention may, of course, be provided with different style mounts. Another common style of mast arm mount is a saddle plate with band connectors so that the clamp assembly is fittable on the side of the mast arm. FIGS. 23-30 illustrate the inventive clamp assembly with a band style saddle mount designated generally by the reference number 200.

The clamp assembly 200 comprises a first clamp member 202 and a second clamp member 204. The first clamp member 202 is similar to the first clamp member 30 in the previously described embodiment and will not be described in detail. The second clamp member 204 has a first end 208 and a second end 210. The second end 210 comprises a saddle plate 212 with band connectors 214 for securing the plate to the side of the mast arm (not shown). In this preferred embodiment, the first end 208 of the second clamp member 204 is a connector head 220, shown in more detail in FIGS. 26-29. The rear end 222 of the connector head 220 has a neck 224 rotatably receivable in a collar 226 formed on the front of the plate 212. See FIG. 25. The connector head 220 is secured in the desired rotational position by one or more bolts 228, depending on whether the saddle plate 212 is one part or two parts.

The front end 230 of the connector head 220 is similar to the first end of the second clamp 32 previously described. The front end 230 defines a joint face 234 with a serrated ring 236 and forms an access window 238 similar to the first end 34 of the first clamp member 30 in the previous embodiment. In other respects the clamp assembly 200 functions similarly to the tenon-style clamp assembly previously described. The assembly clamp assembly 200 defines similarly straight conductor path 240 extending the length of the assembly from the opening 242 (FIG. 30) in the saddle plate 212 to the opening 244 in the saddle plate 246 in the first clamp 202.

Another common style of mast arm connector is a cable-mount. A clamp assembly 300, shown in FIGS. 31-34, illustrates this type of mount incorporated in the clamp assembly of the present invention. The clamp assembly 300 comprises a first clamp member 302, like the clamp members 202 and 30 of the previously described embodiment. The clamp assembly 300 further comprises a second clamp member 304, which has a saddle plate 306 similar to the plate 212 of the previous band-style assembly 200. However, instead of the bands 214, the second clamp member 304 employs cables 308 in a known manner to attach the plate 306 to the mast arm (not shown). The second clamp member 304 includes a connector head 310 similar to the connector head 220 of the band-style assembly described above. As in the previous embodiments, the clamp assembly 300 provides a substantially straight conductor path 312 that extends end-to-end through the assembly, as indicated by the arrow 312 in FIG. 33, from the opening 316 in the saddle plate 306 in the second clamp 304 to the opening 318 in the saddle plate 320 in the first clamp 302.

Now it will be appreciated that the clamp assembly, bracket assembly, mounting assembly and traffic control assembly of the present invention provides significant advantages in installation of traffic devices. The straight path through the clamp assembly facilitates the placement of the conductors during installation of the device. Additionally, the deeper arm cover on the bracket arm reduces the sharpness of the turns required when threading the conductor through the bracket.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. An articulating clamp assembly for attaching a bracket assembly supporting a traffic control device to an elongate support structure to form a traffic control assembly, the clamp assembly comprising:

a first clamp member having a first end and a second end, an opening in the first end, an opening in the second end, and an internal channel connecting the openings in the first and second ends forming a substantially straight first conductor path segment therethrough, the first clamp member having a longitudinal axis;

a second clamp member having a first end and a second end, an opening in the first end, an opening in the second end, and an internal channel connecting the openings in the first and second ends forming a substantially straight second conductor path segment therethrough, the second clamp member having a longitudinal axis;

wherein the first end of the first clamp member and first end of the second clamp member are connectable to each other to form an articulating joint that connects the first and second conductor path segments to form a conductor path extending through the connected first and second clamp members that is straight when the longitudinal axes of the first and second clamp members are parallel; and wherein in the assembled clamp assembly the joint is positioned on one side only of the conductor path, wherein the clamp assembly further comprises a bolt for securing the joint in a selected position, and wherein the bolt does not extend across the conductor path.

2. The clamp assembly of claim 1 wherein the joint comprises a first joint face on the first end of the first clamp member and a second joint face on the first end of the second clamp member, wherein the first and second joint faces defining inter-engaging surfaces whereby one of the first and second joint faces can be rotated relative to the other of the first and second joint faces to angle one of the first and second clamp members relative to the other of the first and second clamp members.

3. The clamp assembly of claim 2 wherein the inter-engaging surfaces comprises a first serrated ring on the first end of the first clamp member and a second serrated ring on the first end of the second clamp member.

4. The clamp assembly of claim 1 wherein the elongate support structure is a mast arm and wherein the second end of the second clamp member comprises a tenon sleeve fittable on the end of the mast arm.

5. The clamp assembly of claim 1 wherein the elongate support structure is a mast arm and wherein the second end of the second clamp member comprises a cable-mounted plate fittable to the side of the mast arm with a plurality of cables.

6. The clamp assembly of claim 1 wherein the elongate support structure is a mast arm and wherein the second end of the second clamp member comprises a band-mounted plate fittable to the side of the mast arm with a plurality of bands.

7. A support assembly for a traffic control device comprising a bracket assembly for holding the traffic control device and the clamp assembly of claim 1.

8. The support assembly of claim 7 wherein the bracket assembly comprises an elongate tube and wherein the second end of the first clamp member is attachable to the elongate tube.

9. A traffic control assembly comprising a traffic control device and the support assembly of claim 8.

10. The clamp assembly of claim 1 wherein the joint comprises a first joint face on the first end of the first clamp member and a second joint face on the first end of the second clamp member, wherein the first and second joint faces defining inter-engaging surfaces, and wherein the first and second clamp members are connected to each other the joint is offset from the longitudinal axis of both the first and second clamp members.

11. The clamp assembly of claim 10 wherein the first ends of the first and second clamp members are configured to that, when the first and second clamp members are connected to each other, the connected first and second ends form a window that provides access to the conductor path when the first and second clamp members are connected to each other.

12. The clamp assembly of claim 1 wherein the first ends of the first and second clamp members are configured to that, when the first and second clamp members are connected to each other, the connected first and second ends form a window that provides access to the conductor path when the first and second clamp members are connected to each other.

* * * * *

UNITED STATES PATENT AND TRADEMARK OFFICE

CERTIFICATE OF CORRECTION

PATENT NO. : 9,316,349 B1
APPLICATION NO. : 14/215008
DATED : April 19, 2016
INVENTOR(S) : Stephen P. Parduhn, Kennith E. George and Derric K. Drake It is certified that error appears in the above-identified patent and that said Letters Patent is hereby corrected as shown below:

In the Specification:

Column 1, line 56: replace “is left” with --is a left--.
Column 2, line 1: replace “is horizontal” with --is a horizontal--.
Column 2, line 8: replace “is horizontal” with --is a horizontal--.
Column 2, line 49: replace “device,” with --Device,--.
Column 2, line 58: replace “increasing” with --increasingly--.
Column 4, line 7: replace “joint 80, permits” with --joint 80 permits--.
Column 4, line 24: replace “appreciated the” with --appreciated that the--.
Column 4, line 34: replace “FIG. 13-17” with --FIGS. 13-17--.
Column 4, line 39: replace “because the” with --because of the--.

Signed and Sealed this
Twenty-first Day of June, 2016

Michelle K. Lee

Michelle K. Lee
*Director of the United States Patent and Trademark Office*